(12) United States Patent
Takahashi et al.

(10) Patent No.: US 10,406,936 B2
(45) Date of Patent: Sep. 10, 2019

(54) MOTOR VEHICLE INCLUDING A CONTROLLER FOR APPLYING A BRAKING FORCE ACCORDING TO AN ACCELERATOR OPERATION AMOUNT

(71) Applicant: TOYOTA JIDOSHA KABUSHIKI KAISHA, Toyota-shi, Aichi-ken (JP)

(72) Inventors: Yoshimitsu Takahashi, Toyota (JP); Yoshikazu Motozono, Toyota (JP); Tomoya Yamaguchi, Toyota (JP)

(73) Assignee: TOYOTA JIDOSHA KABUSHIKI KAISHA, Toyota-Shi, Aichi-ken (JP)

( * ) Notice: Subject to any disclaimer, the term of this patent is extended or adjusted under 35 U.S.C. 154(b) by 193 days.

(21) Appl. No.: 15/626,284

(22) Filed: Jun. 19, 2017

(65) Prior Publication Data

US 2018/0001787 A1    Jan. 4, 2018

(30) Foreign Application Priority Data

Jul. 4, 2016    (JP) .................................. 2016-132429

(51) Int. Cl.
    *B60L 15/20* (2006.01)

(52) U.S. Cl.
    CPC ....... *B60L 15/2009* (2013.01); *B60L 2240/14* (2013.01); *B60L 2250/00* (2013.01); *Y02T 10/645* (2013.01); *Y02T 10/72* (2013.01); *Y02T 10/7275* (2013.01)

(58) Field of Classification Search
    CPC ............ B60L 15/2009; B60L 2250/00; B60L 2240/14; Y02T 10/72; Y02T 10/7275; Y02T 10/645
    See application file for complete search history.

(56) References Cited

U.S. PATENT DOCUMENTS

| 5,873,426 A * | 2/1999 | Tabata | B60K 6/365 |
| | | | 180/65.7 |
| 9,988,052 B2 * | 6/2018 | Tsuruta | B60W 10/08 |
| 2013/0024061 A1 | 1/2013 | Yagura et al. | |
| 2015/0166065 A1 | 6/2015 | Kuroki et al. | |
| 2015/0222208 A1 | 8/2015 | Hisano | |

(Continued)

FOREIGN PATENT DOCUMENTS

| JP | 2001-219831 A | 8/2001 |
| JP | 2012-232671 A | 11/2012 |

(Continued)

*Primary Examiner* — Jelani A Smith
*Assistant Examiner* — Majdi Alsomiri
(74) *Attorney, Agent, or Firm* — Sughrue Mion, PLLC

(57) ABSTRACT

In a motor vehicle, an accelerator operation amount is changed among a first region, a second region, and a third region. The motor vehicle is configured to perform a first control that applies a braking force to the vehicle when the accelerator operation amount is at least in the first region or in the second region or to perform a second control that applies a smaller braking force to the vehicle than the braking force applied by the first control when the accelerator operation amount is in the first region or in the second region. The motor vehicle is also configured to continue execution of the first control without changing over control to the second control, when an execution request for the second control is given during execution of the first control in the second region of the accelerator operation amount.

4 Claims, 6 Drawing Sheets

(56) References Cited

U.S. PATENT DOCUMENTS

| | | | | |
|---|---|---|---|---|
| 2016/0325747 A1* | 11/2016 | Tsuruta | ................. | B60W 10/08 |
| 2017/0259802 A1* | 9/2017 | Kato | ...................... | B60K 6/365 |
| 2018/0009434 A1* | 1/2018 | Hayakawa | ............. | B60K 6/445 |

FOREIGN PATENT DOCUMENTS

| | | |
|---|---|---|
| JP | 2013-23052 A | 2/2013 |
| JP | 2013-035370 A | 2/2013 |
| JP | 2014-083999 A | 5/2014 |
| JP | 2015-132230 A | 7/2015 |
| JP | 2015-143072 A | 8/2015 |
| JP | 2015-227097 A | 12/2015 |
| WO | 2015/107381 A1 | 7/2015 |

* cited by examiner

| CASE NUMBERS | ACCELERATOR POSITION Acc | REQUIRED TORQUE Frq | CONTROL FLAG Fco |
| --- | --- | --- | --- |
| 1 | FIRST REGION (Acc=0) | 1→1 | 1→1 |
| 2 | | 0→0 | 0→0 |
| 3 | | 0→1 | 0→1 |
| 4 | | 1→0 | 1→0 |
| 5 | SECOND REGION (0<Acc<A1) | 1→1 | 1→1 |
| 6 | | 0→0 | 0→0 |
| 7 | | 0→1 | 0→0 |
| 8 | | 1→0 | 1→0 |
| 9 | THIRD REGION (Acc≧A1) | 1→1 | 1→1 |
| 10 | | 0→0 | 0→0 |
| 11 | | 0→1 | 0→1 |
| 12 | | 1→0 | 1→0 |

Fig. 5

MOTOR VEHICLE INCLUDING A CONTROLLER FOR APPLYING A BRAKING FORCE ACCORDING TO AN ACCELERATOR OPERATION AMOUNT

CROSS-REFERENCE TO RELATED APPLICATION

The present disclosure claims priority to Japanese Patent Application No. 2016-132429 filed Jul. 4, 2016, which is incorporated herein by reference in its entirety including specification, drawings and claims.

TECHNICAL FIELD

The present disclosure relates to a motor vehicle and more specifically to a motor vehicle equipped with a motor and a battery.

BACKGROUND

A proposed configuration of a motor vehicle includes a motor for driving and controls the motor such as to apply a braking force to the vehicle in an accelerator-off state (for example, JP 2013-35370A). This motor vehicle is configured to reduce the braking force applied to the vehicle in the accelerator-off state in an on position of an eco-switch that enables an eco-mode, compared with the braking force applied in an off position of the eco-switch that enables a normal mode.

CITATION LIST

Patent Literature

PTL 1: JP 2013-035370A

SUMMARY

This motor vehicle is expected to apply the braking force to the vehicle according to the setting of either the normal mode or the eco-mode, not only in the accelerator-off state but in the state of slight accelerator operation (for example, in the state that an accelerator operation amount is greater than 0% and is less than about 10%). Reducing the braking force in response to an on operation of the eco-switch in the state of slight accelerator operation (i.e., providing the braking force in the eco-mode) is likely to cause the driver of the vehicle to feel elimination of the deceleration of the vehicle.

The motor vehicle of the disclosure thus mainly aims to suppress a driver of the vehicle from feeling elimination of deceleration of the vehicle when the driver performs a slight accelerator operation to apply a braking force to the vehicle.

In order to achieve the above object, the motor vehicle of the disclosure is implemented by an aspect described below.

The present disclosure is directed to a motor vehicle. The motor vehicle including a motor for driving, a battery configured to transmit electric power to and from the motor and a control device configured to control the motor such as to apply either a driving force or a braking force according to an accelerator operation amount to be applied to the vehicle. The accelerator operation amount is changed among a first region in which the accelerator operation amount is equal to a value 0, a second region in which the accelerator operation amount is greater than the value 0 and is less than a predetermined operation amount, and a third region in which the accelerator operation amount is equal to or greater than the predetermined operation amount. The control device is configured to perform a first control that applies the braking force to the vehicle when the accelerator operation amount is at least in the first region or in the second region or to perform a second control that applies a smaller braking force to the vehicle than the braking force applied by the first control when the accelerator operation amount is in the first region or in the second region, and the control device is configured to continue execution of the first control without changing over control to the second control, when an execution request for the second control is given during execution of the first control in the second region of the accelerator operation amount.

In the motor vehicle of this aspect, the accelerator operation amount is changed among the first region in which the accelerator operation amount is equal to the value 0, the second region in which the accelerator operation amount is greater than the value 0 and is less than the predetermined operation amount, and the third region in which the accelerator operation amount is equal to or greater than the predetermined operation amount. The motor vehicle is configured to perform the first control that applies the braking force to the vehicle when the accelerator operation amount is at least in the first region or in the second region or to perform the second control that applies the smaller braking force to the vehicle than the braking force applied by the first control when the accelerator operation amount is in the first region or in the second region. The motor vehicle is also configured to continue execution of the first control without changing over the control to the second control, when the execution request for the second control is given during execution of the first control in the second region of the accelerator operation amount. This configuration suppresses decrease in the braking force (i.e., suppresses reduction of the progressiveness of the relationship between the accelerator operation amount and the braking force) in the second region of the accelerator operation amount (in the state of slight accelerator operation to apply the braking force to the vehicle), compared with a configuration that changes over the control to the second control. As a result, this configuration suppresses the driver from feeling elimination of the deceleration of the vehicle in the second region of the accelerator operation amount. The "execution request for the second control" may be given in an on position of an eco-switch operated to enable an eco-mode that gives preference to the fuel consumption compared with a normal mode.

BRIEF DESCRIPTION OF DRAWINGS

FIG. 5 is a diagram illustrating relationships of an accelerator position Acc and a request flag Frq to a control flag Fco when the control flag setting routine of FIG. 4 is performed;

DESCRIPTION OF EMBODIMENTS

The following describes aspects of the disclosure with reference to some embodiments.

Figure 1:
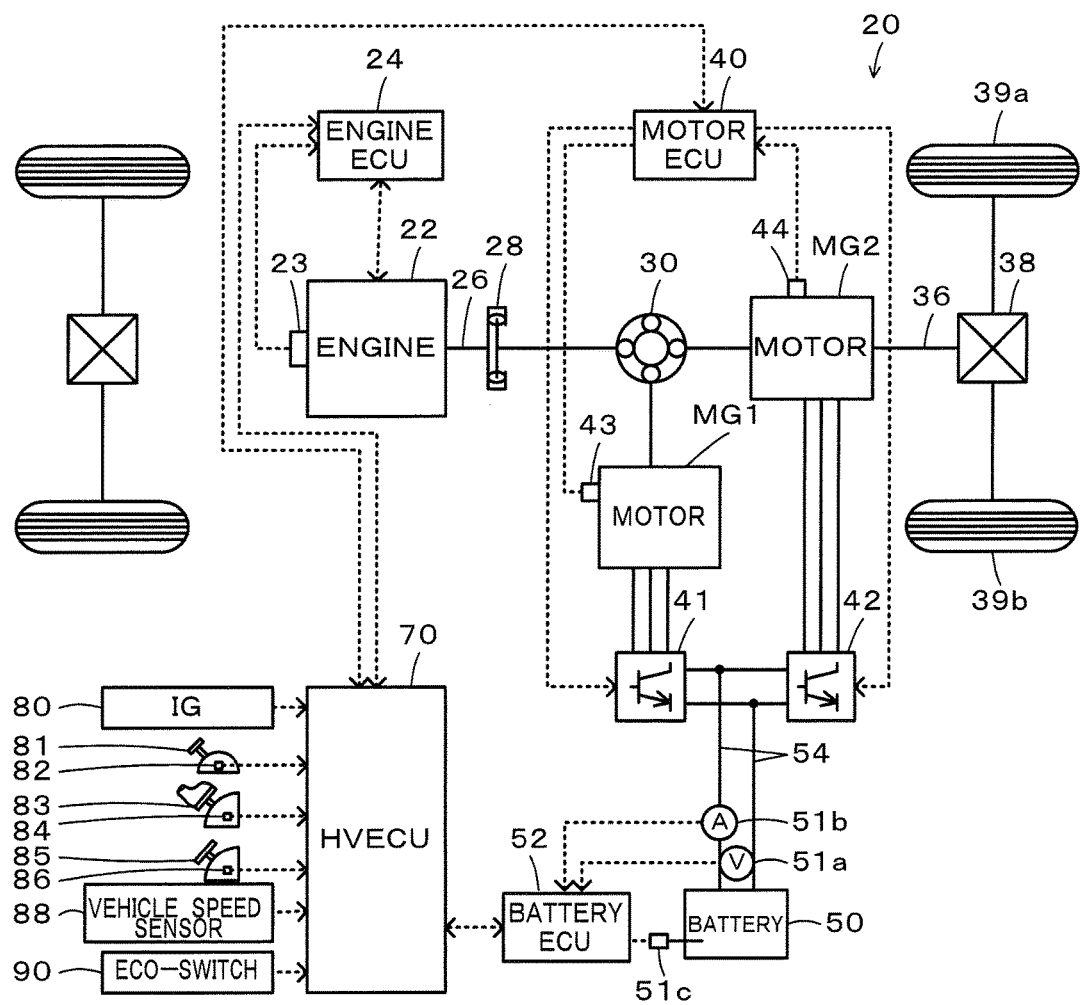
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment is configured to include an engine 22, a planetary gear 30, motors MG1 and MG2, inverters 41 and 42, a battery 50 and a hybrid electronic control unit (hereinafter referred to as "HVECU") 70.

The engine 22 is configured as an internal combustion engine to output power using, for example, gasoline or light oil as a fuel. This engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. The engine ECU 24 receives signals input from various sensors required for operation control of the engine 22 via the input port, for example, a crank angle θcr from a crank position sensor 23 configured to detect the rotational position of a crankshaft 26 of the engine 22. The engine ECU 24 outputs various control signals for the operation control of the engine 22 via the output port. The engine ECU 24 is connected with the HVECU 70 via the respective communication ports. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via a damper 28.

The motor MG1 is configured as, for example, a synchronous motor generator and has the rotor that is connected with the sun gear of the planetary gear 30 as described above. The motor MG2 is configured as, for example, a synchronous motor generator and has a rotor that is connected with the driveshaft 36. The inverter 41 and the inverter 42 are respectively connected with the motor MG1 and the motor MG2 and are also connected with the battery 50 via power lines 54. The motor MG1 and the motor MG2 are driven and rotated by switching control of a plurality of switching elements (not shown) included in the respective inverters 41 and 42 by a motor electronic control unit (hereinafter referred to as "motor ECU") 40.

The motor ECU 40 is configured as a CPU-based microprocessor and includes a ROM configured to store processing programs, a RAM configured to temporarily store data, input/output ports and a communication port, in addition to the CPU, although not being illustrated. The motor ECU 40 receives signals input from various sensors required for drive control of the motors MG1 and MG2 via the input port, for example, rotational positions θm1 and θm2 from rotational position detection sensors 43 and 44 configured to detect the rotational positions of the respective rotors of the motors MG1 and MG2. The motor ECU 40 outputs, for example, switching control signals to the plurality of switching elements (not shown) included in the respective inverters 41 and 42 via the output port. The motor ECU 40 is connected with the HVECU 70 via the respective communication ports. The motor ECU 40 calculates rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured by, for example, a lithium ion rechargeable battery or a nickel metal hydride battery and is connected with the inverters 41 and 42 via the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. The battery ECU 52 receives signals input from various sensors required for management of the battery 50 via the input port. The signals input into the battery ECU 52 include, for example, a battery voltage Vb from a voltage sensor 51a placed between terminals of the battery 50, a battery current Ib from a current sensor 51b mounted to an output terminal of the battery 50, and a battery temperature Tb from a temperature sensor 51c mounted to the battery 50. The battery ECU 52 is connected with the HVECU 70 via the respective communication ports. The battery ECU 52 calculates a state of charge SOC of the battery 50, based on an integrated value of the battery current Ib from the current sensor 51b. The state of charge SOC denotes a ratio of the capacity of electric power dischargeable from the battery 50 to the overall capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. The HVECU 70 receives signals input from various sensors via the input port. The signals input into the HVECU 70 include, for example, an ignition signal from an ignition switch 80 and a shift position SP from a shift position sensor 82 configured to detect an operating position of a shift lever 81. The shift position SP includes, for example, a parking position (P position), a reverse position (R position), a neutral position (N position) and a drive position (D position). The input signals also include, for example, an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The input signals further include an eco-switch signal from an eco-switch 90 operated to enable an eco-mode that gives preference to the fuel consumption compared with a normal mode, as a drive mode Md. The HVECU 70 is connected with the engine ECU 24, the motor ECU 40 and the battery ECU 52 via the respective communication ports as described above.

The hybrid vehicle 20 of the embodiment having the above configuration sets a required driving force of the driveshaft 36 based on the accelerator position Acc and the vehicle speed V and controls the operations of the engine 22 and the motors MG1 and MG2 such as to output a required power meeting the required driving force to the driveshaft 36. There are three modes (1) to (3) given below as operation modes of the engine 22 and the motors MG1 and MG2:

(1) torque conversion drive mode: mode of operating and controlling the engine 22 such as to output a power meeting the required power from the engine 22 and driving and controlling the motors MG1 and MG2 such as to output the required power to the driveshaft 36 through torque conversion of all the power output from the engine 22 by the planetary gear 30 and the motors MG1 and MG2;

(2) charge-discharge drive mode: mode of operating and controlling the engine 22 such as to output a power meeting the sum of the required power and electric power required for charge or discharge of the battery 50 and driving and controlling the motors MG1 and MG2 such as to output the required power to the driveshaft 36 through torque conversion of all or part of the power output from the engine 22 by the planetary gear 30 and the motors MG1 and MG2 accompanied with charge or discharge of the battery 50; and (3) motor drive mode: mode of driving and controlling the motor MG2 such as to output the required power to the driveshaft 36, while stopping operation of the engine 22.

Figure 2:
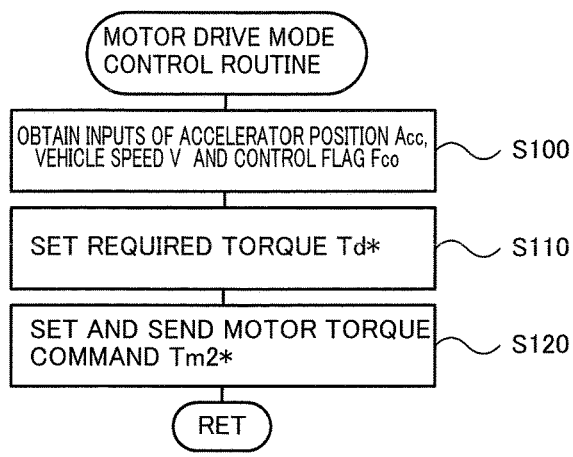
FIG. 2 is a flowchart showing one example of a motor drive mode control routine performed by an HVECU according to the embodiment.

The following describes operations of the hybrid vehicle 20 of the embodiment having the above configuration and more specifically operations when the hybrid vehicle 20 is driven in the motor drive mode. FIG. 2 is a flowchart showing one example of a motor drive mode control routine performed by the HVECU 70 according to the embodiment. This routine is repeatedly performed at predetermined time intervals (for example, every several msec). When the hybrid vehicle 20 is driven in the motor drive mode, the hybrid vehicle 20 stops operation of the engine 22 and performs switching control of the plurality of switching elements included in the inverter 41 such as not to output a torque from the motor MG1 by cooperative control of the HVECU 70, the engine ECU 24 and the motor ECU 40, in parallel to this routine.

When the motor drive mode control routine is triggered, the HVECU 70 first obtains input data, for example, the accelerator position Acc, the vehicle speed V and a control flag Fco (step S100). The accelerator position Acc input here is the accelerator position Acc detected by the accelerator pedal position sensor 84. The vehicle speed V input here is the vehicle speed V detected by the vehicle speed sensor 88. The control flag Fco is a flag indicating whether control (second control described later) is to be performed such as to relatively decrease the braking force that is to be applied to the vehicle in an accelerator off state or in the state of a slight accelerator operation. The control flag Fco input here is the control flag Fco set by a control flag setting routine described later. The details of this control flag Fco will be described later.

After obtaining the input data, the HVECU 70 sets a required torque Td* that is required for the vehicle (i.e., required for the driveshaft 36), based on the input accelerator position Acc, the input vehicle speed V and the input control flag Fco (step S110). A procedure of setting the required torque Td* stores in advance relationships of the accelerator position Acc and the control flag Fco to the required torque Td*, with respect to different vehicle speeds V as a plurality of required torque setting maps. When the vehicle speed V, the accelerator position Acc and the control flag Fco are input, the procedure selects a map corresponding to the input vehicle speed V among the plurality of required torque setting maps and reads and sets the required torque Td* corresponding to the input accelerator position Acc and the input control flag Fco from the selected map. A positive value of the required torque Td* indicates that a drive torque is required for the vehicle (i.e., the driveshaft 36), whereas a negative value of the required torque Td* indicates that a braking torque is required for the vehicle.

Figure 3:
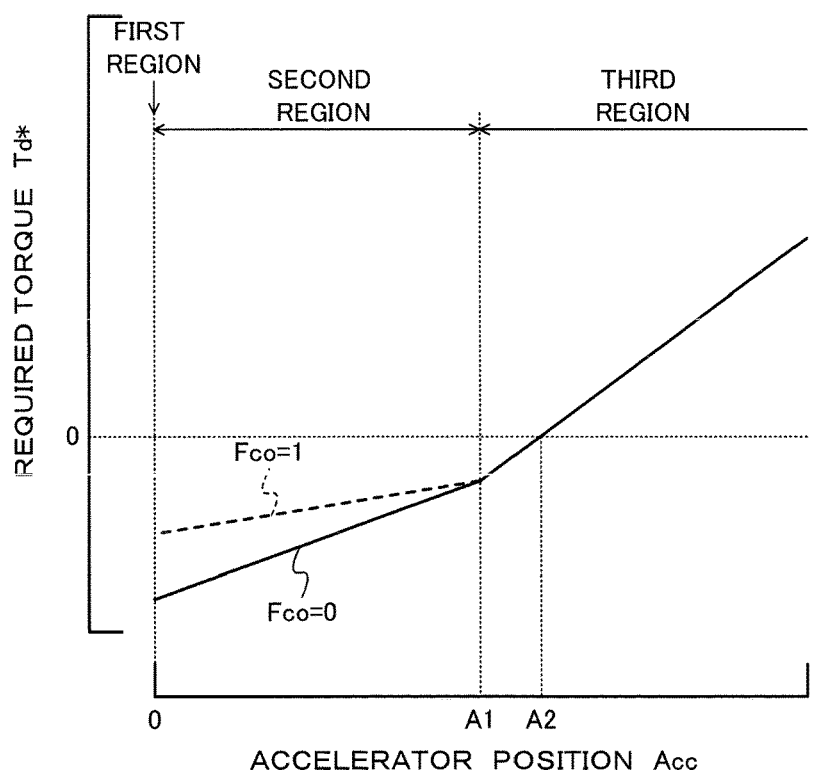
FIG. 3 is a diagram illustrating one example of part of a required torque setting map with respect to a certain vehicle speed V.

FIG. 3 is a diagram illustrating one example of part of the required torque setting map with respect to a certain vehicle speed V. FIG. 3 illustrates regions of relatively small accelerator position Acc. A solid line graph shows a relationship between the accelerator position Acc and the required torque Td* when the control flag Fco is equal to value 0 (hereinafter referred to as "first relationship"), with respect to a first region (region in the accelerator off state) where the accelerator position Acc is equal to value 0, a second region (region in the state of slight accelerator operation) where the accelerator position Acc is greater than the value 0 and is less than a value A1 (for example, 8%, 10% or 12%), and a third region where the accelerator position Acc is equal to or greater than the value A1. A broken line graph shows a relationship between the accelerator position Acc and the required torque Td* when the control flag Fco is equal to value 1 (hereinafter referred to as "second relationship"), with respect to the first region, the second region and the third region of the accelerator position Acc. As shown by the solid line graph, the first relationship is determined such that the required torque Td* continuously increases with an increase in the accelerator position Acc and that the required torque Td* has negative values (indicating the braking torque) in at least the first region and the second region. As shown by the broken line graph, on the other hand, the second relationship is determined such that the required torque Td* continuously increases with an increase in the accelerator position Acc, that the second relationship is identical with the first relationship in the third region and that the required torque Td* increases in the negative range compared with the first relationship in the first region and the second region (i.e., decreasing as the braking force). In the diagram of FIG. 3, a value A2 of the accelerator position Acc at the required torque Td* equal to the value 0 is set to be greater than the value A1 as the lower limit value of the accelerator position Acc in the third region. According to a modification, the value A2 may be set equal to the value A1.

After setting the required torque Td*, the HVECU 70 sets the required torque Td* to a torque command Tm2* of the motor MG2 and sends the torque command Tm2* of the motor MG2 to the motor ECU 40 (step S120) and then terminates this routine. When receiving the torque command Tm2* of the motor MG2, the motor ECU 40 performs switching control of the plurality of switching elements included in the inverter 42, such as to drive the motor MG2 with the torque command Tm2*.

When the required torque Td* set as the torque command Tm2* of the motor MG2 is a positive value (indicating the drive torque), the power drive of the motor MG2 is performed to apply a positive torque, i.e., the drive torque, to the driveshaft 36. When the required torque Td* set as the torque command Tm2* of the motor MG2 is a negative value (indicating the braking torque), on the other hand, the regenerative drive of the motor MG2 is performed to apply a negative torque, i.e., the braking torque, to the driveshaft 36.

In the description below, control when the control flag Fco is equal to the value 0 (i.e., control of setting the required torque Td* as the torque command Tm2* of the motor MG2 based on the first relationship and controlling the motor MG2) is called "first control". Control when the control flag Fco is equal to the value 1 (i.e., control of setting the required torque Td* as the torque command Tm2* of the motor MG2 based on the second relationship and controlling the motor MG2) is called "second control". The first control causes the braking torque to be applied to the vehicle (i.e., the driveshaft 36) when the accelerator position Acc is at least in the first region or in the second region. The second control is identical with the first control when the accelerator position Acc is in the third region, and causes the smaller braking torque to be applied to the vehicle compared with the first control when the accelerator position Acc is in the first region or in the second region.

Figure 4:
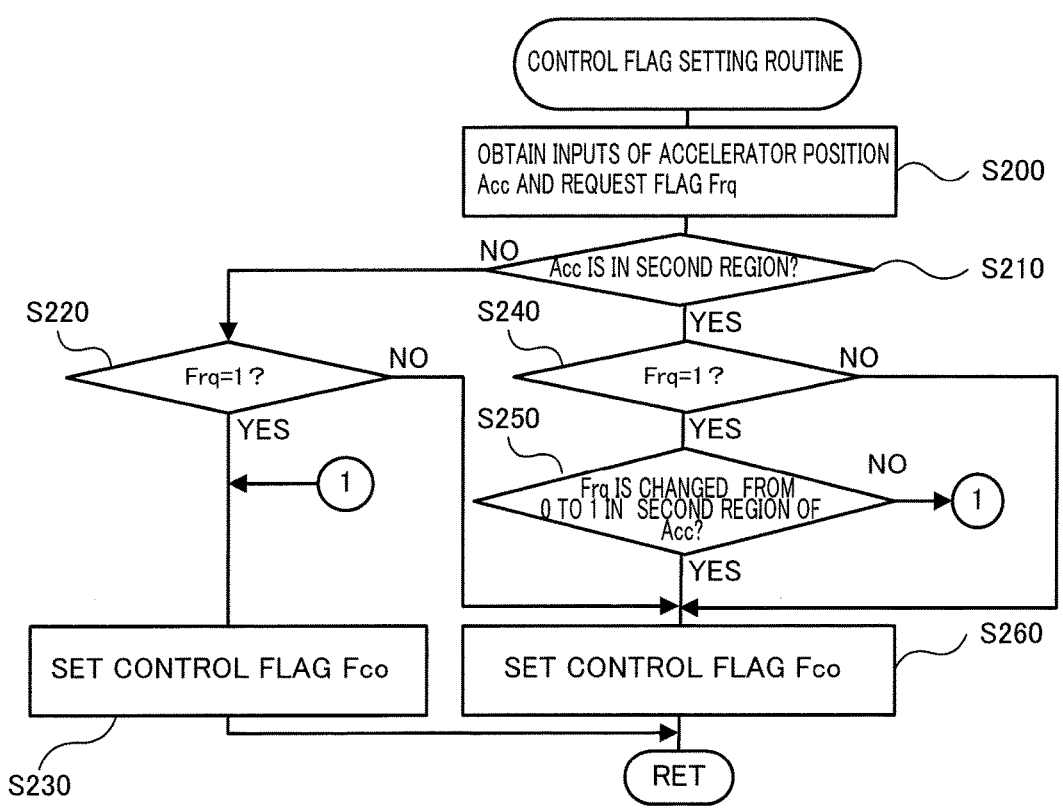
FIG. 4 is a flowchart showing one example of a control flag setting routine.

The following describes a process of setting the control flag Fco used in the motor drive mode control routine of FIG. 2. FIG. 4 is a flowchart showing one example of a control flag setting routine. This routine is repeatedly performed at predetermined time intervals (for example, every several msec).

When the control flag setting routine is triggered, the HVECU 70 first obtains input data of the accelerator position Acc and a request flag Frq (step S200). The accelerator position Acc input here is the same as described above. The request flag Frq input here is set to value 0 when there is an execution request for the first control but no execution request for the second control, while being set to value 1 when there is no execution request for the first control but an execution request for the second control. According to this embodiment, when the eco-switch 90 is off (i.e., when the drive mode Md is the normal mode), the request flag Frq is set to the value 0 upon determination, that there is an execution request for the first control. When the eco-switch 90 is on (i.e., when the drive mode Md is the eco-mode), on the other hand, the request flag Frq is set to the value 1 upon determination that there is an execution request for the second control.

After obtaining the input data, the HVECU 70 determines whether the input accelerator position Acc is in the first region (Acc=0%), in the second region (0<Acc<A1) or in the third region (Acc≥A1) (step S210). When it is determined that the accelerator position Acc is either in the first region or in the third region, the HVECU 70 checks the setting of the request flag Frq (step S220). When the request flag Frq is the value 0, the HVECU 70 determines that there is an execution request for the first control and sets the control flag Fco to the value 0 (step S260) and then terminates this routine. When the request flag Frq is the value 1, on the other hand, the HVECU 70 determines that there is an execution request for the second control and sets the control flag Fco to the value 1 (step S230) and terminates this routine. Accordingly, when the accelerator position Acc is either in the first region or in the third region, the HVECU 70 performs the first control in response to an execution request for the first control, while performing the second control in response to an execution request for the second control.

When it is determined at step S210 that the accelerator position Acc is in the second region, on the other hand, the HVECU 70 checks the setting of the request flag Frq (step S240). When the request flag Frq is the value 0, the HVECU 70 determines that there is an execution request for the first control and sets the control flag Fco to the value 0 (step S260) and then terminates this routine. Accordingly the first control is performed when the accelerator position Acc is in the second region and there is an execution request for the first control.

When the request flag Frq is the value 1 at step S240, on the other hand, the HVECU 70 determines that there is an execution request for the second control and subsequently determines whether the request flag Frq is changed over from the value 0 to the value 1 in the second region of the accelerator position Acc (step S250). When it is determined that the request flag Frq is changed over from the value 0 to the value 1 in the second region of the accelerator position Acc, it is expected that an execution request for the first control is changed over to an execution request for the second control in the second region of the accelerator position Acc. In this case, the HVECU 70 ignores the execution request for the second control and sets the control flag Fco to the value 0 (step S260) and then terminates this routine. Accordingly, when an execution request for the second control is given during execution of the first control in the second region of the accelerator position Acc, the control is not changed over to the second control but continues execution of the first control. This configuration suppresses decrease in the braking torque (i.e., suppresses reduction of the progressiveness of the relationship between the accelerator position Acc and the required torque Td*) in the second region of the accelerator position Acc (in the state of slight accelerator operation to apply the braking force to the vehicle), compared with a configuration that changes over the control to the second control. As a result, this configuration suppresses the driver from feeling elimination of the deceleration of the vehicle in the second region of the accelerator position Acc.

When it is determined at step S250 that the request flag Frq is not changed over from the value 0 to the value 1 in the second region of the accelerator position Acc, on the other hand, it is expected that the request flag Frq is change over to the value 1 (the control flag Fco is set to the value 1) in the first region or in the third region of the accelerator position Acc and that the accelerator position Acc shifts to the second region with the request flag Frq kept at the value 1. In this case, the HVECU 70 sets the control flag Fco to the value 1 in response to the setting of the request flag Frq to the value 1 (step S230) and then terminates this routine. Accordingly, when an execution request for the second control is given during execution of the first control in the third region of the accelerator position Acc and the accelerator position Acc subsequently shifts to the second region with the execution request for the second control, this configuration enables a braking force corresponding to the execution request for the second control (i.e., a smaller braking torque than the braking torque applied in the first control) to be applied to the vehicle.

FIG. 5 is a diagram illustrating relationships of the accelerator position Acc and the request flag Frq to the control flag Fco when the control flag setting routine of FIG. 4 is performed. For the ease of explanation, the respective relationships of the accelerator position Acc and the request flag Frq to the control flag Fco are distinguished by case numbers in FIG. 5. In case number 7 of FIG. 5, when the accelerator position Acc is in the second region and the request flag Frq is changed over from the value 0 to the value 1, the control flag Fco is not changed over to the value 1 but is kept at the value 0. Accordingly, when an execution request for the second control is given during execution of the first control in the second region of the accelerator position Acc, the control is not changed over to the second control but continues execution of the first control. This configuration suppresses decrease in the braking torque (i.e., suppresses reduction of the progressiveness of the relationship between the accelerator position Acc and the required torque Td*) in the second region of the accelerator position Acc (in the state of slight accelerator operation to apply the braking force to the vehicle), compared with a configuration that changes over the control to the second control. As a result, this configuration suppresses the driver from feeling elimination of the deceleration of the vehicle in the second region of the accelerator position Acc.

In all the case numbers other than the case number 7 in FIG. 5, the control flag Fco is set to the value 0 in response to the setting of the request flag Frq to the value 0, while being set to the value 1 in response to the setting of the request flag Frq to the value 1. In other words, the first control is performed in response to an execution request for the first control, whereas the second control is performed in response to an execution request for the second control. This configuration provides the advantageous effects described below.

Figure 6:
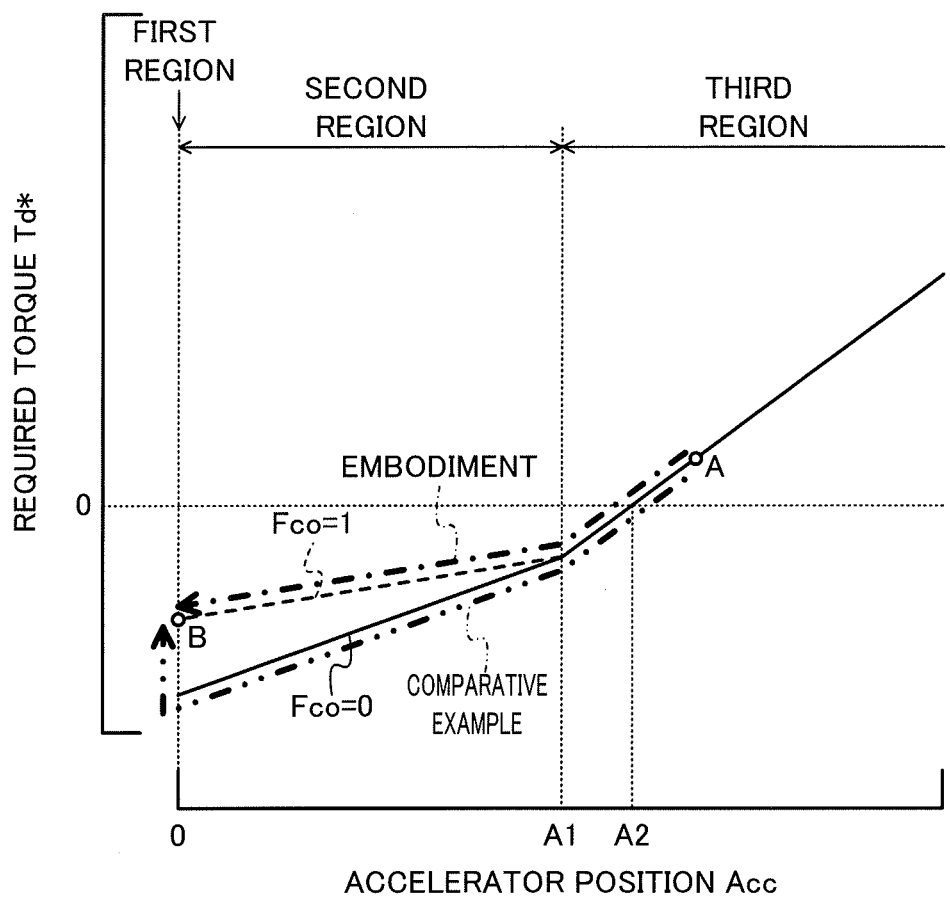
FIG. 6 is a diagram illustrating one example of a variation in relationship when an execution request for a second control is given during execution of a first control in a third region of the accelerator position Acc and the accelerator position Acc subsequently shifts to a first region with the execution request.

It is assumed that an execution request for the second control is given during execution of the first control in the third region of the accelerator position Acc and the accelerator position Acc subsequently shifts to the first region with the execution request. FIG. 6 is a diagram illustrating one example of a variation in the relationship on this assumption. In FIG. 6, a point A indicates the relationship between the accelerator position Acc and the required torque Td* at a start of an execution request for the second control. A point B indicates the relationship between the accelerator position Acc and the request torque Td* when the accelerator position Acc subsequently becomes equal to the value 0. In FIG. 6, a one-dot chain line arrow indicates a variation in the relationship according to the embodiment, and a two-dot chain line arrow indicates a variation in the relationship according to a comparative example. As shown by the two-dot chain line arrow in FIG. 6, the comparative example continues execution of the first control before the accelerator position Acc shifts to the first region and changes over the control to the second control after the accelerator position Acc shifts to the first region. When the accelerator position Acc shifts from the third region to the second region, this comparative example causes a greater braking torque than a braking torque meeting the execution request for the second control to be applied to the vehicle. Additionally, the comparative example decreases the braking torque after the accelerator position Acc shifts to the first region. There is accordingly a possibility that the driver feels elimination of the deceleration of the vehicle at an unexpected timing. The embodiment, on the other hand, changes over the control to the second control when an execution request for the second control is given during execution of the first control in the third region of the accelerator position Acc. As shown by the one-dot chain line arrow in FIG. 6, the embodiment enables a braking torque meeting the execution request for the second control to be applied to the vehicle when the accelerator position Acc shifts from the third region to the second region. This configuration also suppresses decrease in the braking torque after the accelerator position Acc reaches the first region. It is here assumed that an execution request for the second control is continuously given since the accelerator position Acc is in the third region (as shown by the point A in FIG. 6). This configuration accordingly suppresses decrease in the braking torque when the accelerator position Acc is in the first region and thereby suppresses the driver from feeling elimination of the deceleration of the vehicle at an unexpected timing.

The following describes the case where an execution request for the first control is given during execution of the second control in the second region of the accelerator position Acc. In this case, it is expected that the driver desires to increase the braking torque (deceleration) applied to the vehicle. Accordingly the control is changed over to the first control and thereby causes a braking torque meeting the driver's request to be applied to the vehicle.

As described above, the hybrid vehicle 20 of the embodiment is configured to perform the first control that applies a braking torque to the vehicle (i.e., the driveshaft 36) when the accelerator position Acc is at least in the first region or in the second region among the first region (Acc=0%), the second region (0<Acc<A1) and the third region (Acc≥A1) of the accelerator position Acc or to perform the second control that applies a smaller braking torque to the vehicle than the braking torque applied in the first control when the accelerator position Acc is in the first region or in the second region. When an execution request for the second control is given during execution of the first control in the second region of the accelerator position Acc, the hybrid vehicle 20 of the embodiment is configured not to change over the control to the second control but to continue execution of the first control. This configuration suppresses decrease in the braking torque (i.e., suppresses reduction of the progressiveness of the relationship between the accelerator position Acc and the required torque Td*) in the second region of the accelerator position Acc (in the state of slight accelerator operation to apply the braking force to the vehicle), compared with a configuration that changes over the control to the second control. As a result, this configuration suppresses the driver from feeling elimination of the deceleration of the vehicle in the second region of the accelerator position Acc.

In the hybrid vehicle 20 of the embodiment, the second control is identical with the first control when the accelerator position Acc is in the third region. The hybrid vehicle 20 of the embodiment is configured to change over the control to the second control when an execution request for the second control is given during execution of the first control in the third region of the accelerator position Acc and to continue execution of the second control when the accelerator position Acc subsequently shifts to the second region with the execution request. This configuration enables a braking torque meeting the execution request for the second control to be applied to the vehicle when the accelerator position Acc is in the second region. Additionally, when an execution request for the second control is given during execution of the first control in the third region of the accelerator position Acc and the accelerator position Acc subsequently shifts to the first region with the execution request, this configuration suppresses decrease in the braking force in the first, region of the accelerator position Acc, compared with a configuration that changes over the control to the second control after the accelerator position Acc shifts to the first region. It is here assumed that an execution request for the second control is continuously given since the accelerator position Acc is in the third region. This configuration accordingly suppresses decrease in the braking torque when the accelerator position Acc is in the first region and thereby suppresses the driver from feeling elimination of the deceleration of the vehicle at an unexpected timing.

The hybrid vehicle 20 of the embodiment is configured to change over the control to the second control when an execution request for the second control is given during execution of the first control in the third region of the accelerator position Acc. A modified configuration may, however, continue execution of the first control without changing over the control to the second control when an execution request for the second control is given during execution of the first control in the third region of the accelerator position Acc. According to the embodiment, as described above, the control is not changed over from the first control to the second control in the second region of the accelerator position Acc. In the modified configuration that does not change over the control from the first control to the second control in the third region of the accelerator position Acc, when an execution request for the second control is given during execution of the first control in the third region of the accelerator position Acc and the accelerator position Acc subsequently shifts to the first region with the execution request, the control is changed over to the second control after the accelerator position Acc reaches the first region.

The hybrid vehicle 20 of the embodiment is configured to change over the control to the first control when an execution request for the first control is given during execution of the second control in the second region of the accelerator position Acc. A modified configuration may, however, continue execution of the second control without changing over the control to the first control when an execution request for the first control is given during execution of the second control in the second region of the accelerator position Acc.

In the hybrid vehicle 20 of the embodiment, the first control causes the braking torque to be applied to the vehicle (i.e., the driveshaft 36) when the accelerator position Acc is at least in the first region or in the second region. The second control is identical with the first control when the accelerator position Acc is in the third region, and causes the smaller braking torque to be applied to the vehicle compared with the first control when the accelerator position Acc is in the first region or in the second region. According to a modification, however, the second control may be control performed when the accelerator position Acc is in the first region or in the second region. When the accelerator position Acc is in the first region or in the second region, the first control or the second control may be performed according to the setting of the control flag Fco. When the accelerator position Acc is in the third region, the first control may be unconditionally performed. When the request flag Frq is set to the value 0, this modified configuration may continue execution of the first control, irrespective of a shift of the accelerator position Acc from the third region to the second region. When the request flag Frq is set to the value 1, on the other hand, this modified configuration may change over the control to the second control in response to this shift of the accelerator position Acc.

The foregoing describes the control when the hybrid vehicle 20 of the embodiment is driven in the motor drive mode. The same applies to the control in the torque conversion drive mode and the control in the change-discharge drive mode.

The hybrid vehicle 20 of the embodiment is configured to include the engine ECU 24, the motor ECU 40 and the HVECU 70. According to a modification, the engine ECU 24, the motor ECU 40 and the HVECU 70 may be configured by a single electronic control unit.

Figure 7:
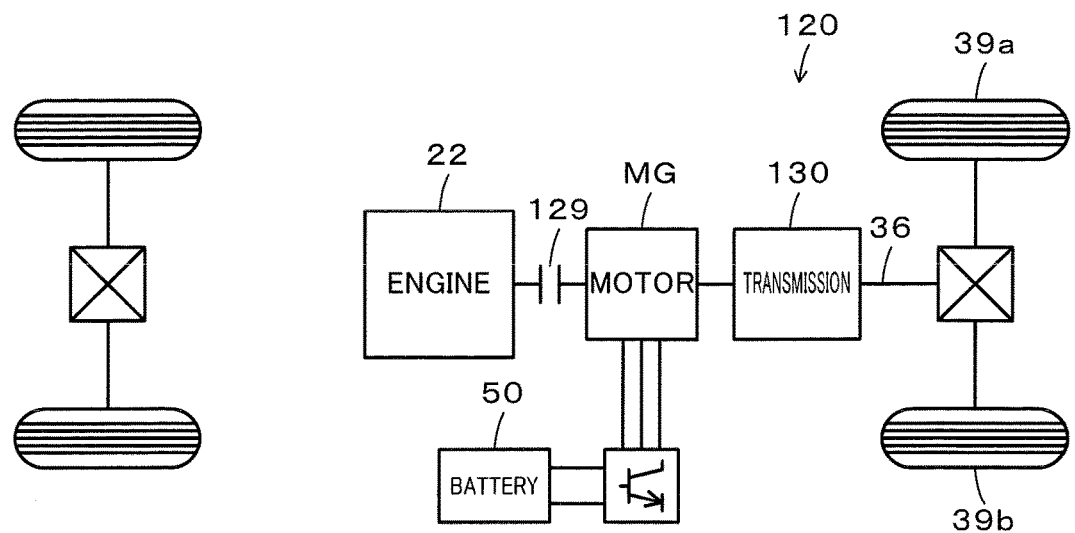
FIG. 7 is a configuration diagram illustrating the schematic configuration of a hybrid vehicle according to a modification.
Figure 8:
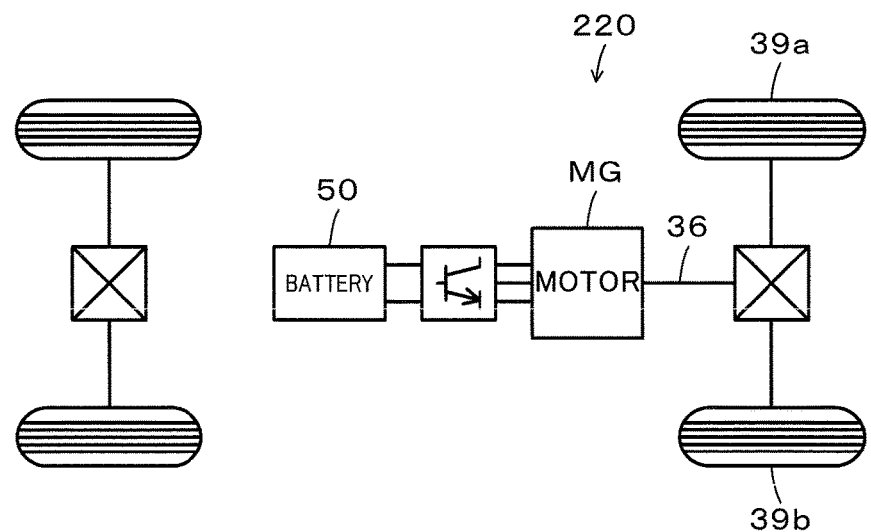
FIG. 8 is a configuration diagram illustrating the schematic configuration of an electric vehicle according to another modification.

The hybrid vehicle 20 of the embodiment is configured such that the engine 22 and the motor MG1 are connected via the planetary gear 30 with the driveshaft 36 coupled with the drive wheels 39a and 39b and that the motor MG2 is connected with the driveshaft 36. As illustrated in FIG. 7, a hybrid vehicle 120 according to a modification may be configured such that a motor MG is connected via a transmission 130 with a driveshaft 36 coupled with drive wheels 39a and 39b and an engine 22 is connected via a clutch 129 with a rotating shaft of the motor MG. As illustrated in FIG. 8, an electric vehicle 220 according to another modification may be configured such that a motor MG for driving is connected with a driveshaft 36 coupled with drive wheels 39a and 39b. The present disclosure may be applied to any configuration that includes a motor for driving.

In the motor vehicle of the above aspect, the second control is identical with the first control when the accelerator operation amount is in the third region, and the control device may be configured to change over the control to the second control when the execution request for the second control is given during execution of the first control in the third region of the accelerator operation amount and to continue execution of the second control when the accelerator operation amount subsequently shifts to the second region with the execution request for the second control. When the execution request for the second control is given during execution of the first control in the third region of the accelerator operation amount and the accelerator operation amount subsequently shifts to the second region with the execution request, this configuration enables a braking force meeting an execution request for the second control (i.e., a smaller braking force than a braking force applied by execution of the first control) to be applied to the vehicle. When the execution request for the second control is given during execution of the first control in the third region of the accelerator operation amount and the accelerator operation amount subsequently shifts to the first region with the execution request, this configuration suppresses decrease in the braking force in the first region of the accelerator operation amount, compared with a configuration that changes over the control to the second control after the accelerator operation amount shifts to the first region. It is here assumed that an execution request for the second control is continuously given since the accelerator operation amount is in the third region. This configuration accordingly suppresses decrease in the braking force when the accelerator operation amount is in the first region and thereby suppresses the driver from feeling elimination of the deceleration of the vehicle at an unexpected timing. The "execution request for the first control" may be given in an off position of the eco-switch.

Additionally, in the motor vehicle of the above aspect, the control device is configured to change over the control to the first control, when an execution request for the first control is given during execution of the second control in the second region of the accelerator operation amount. This configuration enables a braking force meeting an execution request for the first control (i.e., a greater braking force than a braking force applied by execution of the second control) to be applied to the vehicle.

The following describes the correspondence relationship between the primary components of the embodiments and the primary components of the disclosure describes in Summary. The motor MG2 of the embodiment corresponds to the "motor"; the battery 50 corresponds to the "battery"; and the HVECU 70 and the motor ECU 40 executing the motor drive mode control routine of FIG. 2 and the control flag setting routine of FIG. 4 correspond to the "control device"

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The disclosure is applicable to, for example, the manufacturing industries of motor vehicles.

The invention claimed is:

1. A motor vehicle, comprising:
a motor for driving;
a battery configured to transmit electric power to and from the motor; and
a control device configured to control the motor such as to apply either a driving force or a braking force according to an accelerator operation amount to be applied to the vehicle, wherein
the accelerator operation amount is changed among a first region in which the accelerator operation amount is equal to a value 0, a second region in which the accelerator operation amount is greater than the value 0 and is less than a predetermined operation amount, and a third region in which the accelerator operation amount is equal to or greater than the predetermined operation amount, wherein
according to an operation of a user, the control device is configured to perform a first control that applies the braking force to the vehicle when the accelerator operation amount is at least in the first region or in the second region or to perform a second control that applies a smaller braking force to the vehicle than the braking force applied by the first control when the accelerator operation amount is in the first region or in the second region, and
the control device is configured to continue execution of the first control without changing over control to the second control, when an execution request for the second control is given during execution of the first control in the second region of the accelerator operation amount.

2. The motor vehicle according to claim 1,
wherein the second control is identical with the first control when the accelerator operation amount is in the third region, and
the control device is configured to change over the control to the second control when the execution request for the second control is given during execution of the first control in the third region of the accelerator operation amount and to continue execution of the second control when the accelerator operation amount subsequently shifts to the second region with the execution request for the second control.

3. The motor vehicle according to either claim 1,
wherein the control device is configured to change over the control to the first control, when an execution request for the first control is given during execution of the second control in the second region of the accelerator operation amount.

4. The motor vehicle according to claim 2,
wherein the control device is configured to change over the control to the first control, when an execution request for the first control is given during execution of the second control in the second region of the accelerator operation amount.

* * * * *